INVENTORS
Jon R. Ruhlman,
BY Harrison L. Williams,
Byron, Hume, Groen & Clement

May 18, 1965   J. R. RUHLMAN ETAL   3,183,883
INDICATING DEVICE FOR CABLES
Filed Aug. 3, 1961   2 Sheets-Sheet 2
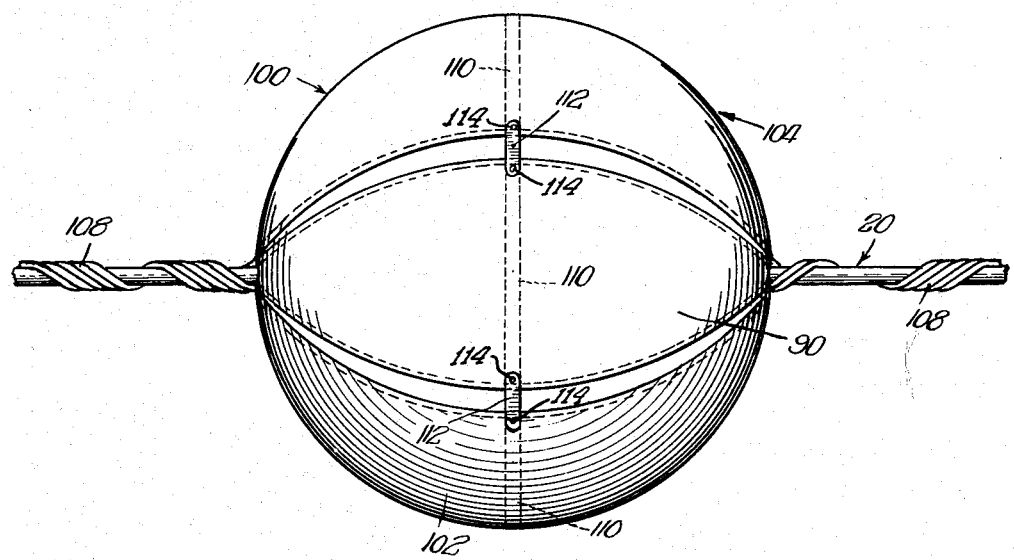
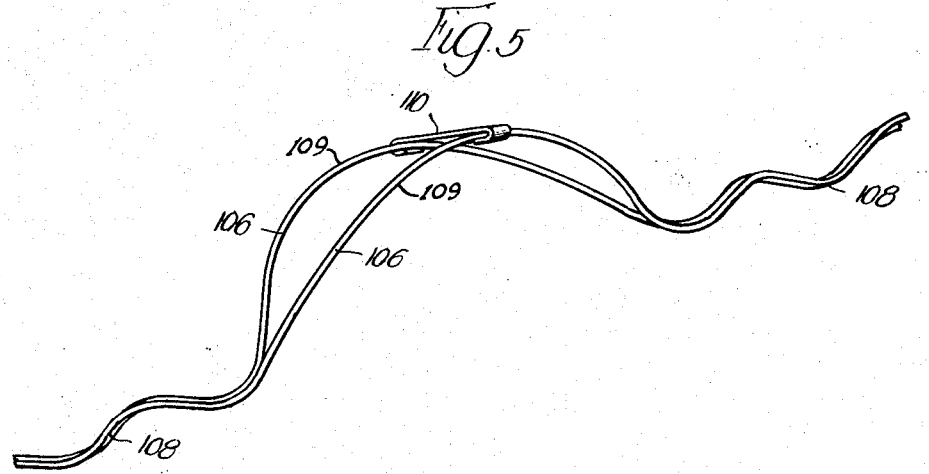
INVENTORS
Jon R. Ruhlman,
BY Harrison L. Williams,
Byron, Hume, Groen + Clement
Attys United States Patent Office 3,183,883
Patented May 18, 1965

3,183,883
INDICATING DEVICE FOR CABLES
Jon R. Ruhlman, Cleveland, and Harrison L. Williams, Euclid, Ohio, assignors to Preformed Line Products Company, Cleveland, Ohio, a corporation of Ohio
Filed Aug. 3, 1961, Ser. No. 129,086
7 Claims. (Cl. 116—114)

This invention pertains to appliances for linear bodies, such as suspended electrical lines, and in particular, to an appliance especially suited for signaling the presence of such linear body.

Electrical lines, particularly those for carrying large amounts of current, such as those commonly designated as high-tension lines, pose a constant problem for aircraft. All too often, one reads of a fatal aircraft accident resulting from the collision of the craft with such lines. Numerous devices have been utilized in the past as means for signaling the presence of such a line to the pilot of the craft. One of the earlier and more common signaling devices is a brightly colored flag or pennant, which is attached and suspended from the line. One of the drawbacks of the flag-type signaling device is that if the wind is from a particular direction, the perspective with respect to the pilot's line of vision may be such that the pilot fails to see it. For this reason the flag-type of signaling device is not completely successful and in fact, is considered unacceptable as a signaling device for electrical lines.

One of the requirements for such a signaling device is that it be substantially light in weight. For obvious reasons the power companies have to be extremely conscious of the weight of appliances suspended from the lines in order not to overload the lines themselves, or the towers from which they are suspended. For this reason other appliances that have been utilized heretofore have not been entirely successful, although they do overcome the disadvantage set forth with regard to the flag-type signaling device. One of the conventional devices now in use consists of a sphere formed of two semi-spherical halves. The sphere is mounted along its polar axis on the line by means of clamps which prevent it from being moved axially along the line. The semi-spherical halves are constructed of metal or other similar material, which are sufficiently weatherproof to provide a reasonable life expectancy. While this type of signaling device does completely fulfill the visual requirement of such a device, it has one drawback which is objectionable.

The drawback of the spherical type of warning device arises from the utilization of clamps for attaching the same to the linear body. These clamps normally have rather rigid jaws and extend for only a very short length along the linear body. It is well known that a linear body, such as an electrical conductor, is in a substantially constant state of vibration due to the climatic elements, such as the wind, to which it is subjected. If the linear body is prevented from vibrating for a short portion of its length, particularly where the line of demarcation between vibration and non-vibration is relatively sharp, there is an area of high stress concentration. Such stress concentration is conducive to fatigue failure of the line. Another disadvantage of the clamps is the fact that they chafe the line and cut into it, particularly an insulated line.

Another drawback of the spherical devices utilized heretofore stems from the fact that the semi-spherical halves tend to fill with moisture as the result of precipitation and condensation. The moisture increases the weight of the sphere to a point that it imposes an unduly heavy load upon the line to which it is attached and the towers of suspension.

This invention provides a signaling device especially adapted to be used in conjunction with suspended electrical lines, and at the same time eliminate the undesirable characteristics of conventional devices used heretofore. This device may be readily attached to a suspended electrical line without the aid of clamps of the type heretofore used and at the same time is relatively light in weight and constructed so as not to accumulate water as the result of condensation or precipitation. The appliance, furthermore, has a minimum of wind-resistance, so that during heavy winds the line is not subjected to any substantially greater stress as the result of any increase in wind resistance. The appliance is readily adapted to be constructed, at least in part, of a plastic material, which may be brightly colored so as to lend itself for the purpose of signaling the presence of the linear body of attachment.

A foremost feature and object of the invention resides in the provision of a signaling device especially suited for attachment to electrical conductors, or other suspended linear bodies.

Another object of the invention resides in the provision of a signaling device, which eliminates the necessity of utilizing clamps which are conducive to fatigue failure of the line, but at the same time may be secured to the line so that there is little axial or radial movement relative to the same.

Another object of the invention resides in the provision of a signaling device, in which the tendency to accumulate moisture as the result of condensation or precipitation is substantially eliminated.

Another object of the invention resides in the provision of a signaling device which has a minimum of air resistance, so that there is substantially little tendency to increase the stress exerted upon a line during heavy winds.

These and other objects will be apparent upon reading of the specification with reference to the following drawings.

In the drawings:

FIGURE 4 is a side view in elevation of a modification embodying the invention.

FIGURE 5 is a perspective view of one of the elements utilized in the construction of the modification shown in FIGURE 4.

The signaling device embodying the invention may be constructed of any materials that have the characteristics and properties necessary to provide the results desired. From time to time hereinafter certain materials will be suggested from which the various elements utilized in the construction of the invention may be fabricated. It is to be understood that these suggested materials are merely by way of example, and are not to be considered as limitations.

For purposes of convenience the signaling device embodying the invention is shown and described herein as defined at least in part a sphere. While the spherical construction is a preferred embodiment it is apparent that other shapes will serve the purpose of signaling the presence of the electrical line to which it is attached. As a matter of fact, the signaling device may take the form of a cube, tetrahedron, cone, pyramid, etc. Thus, the usage of the words "spherical" or "spheroidal" are merely for the purposes of convenience and are not to be considered as a limitation as to the scope of the disclosure or the claims attached hereto.

Figure 1:
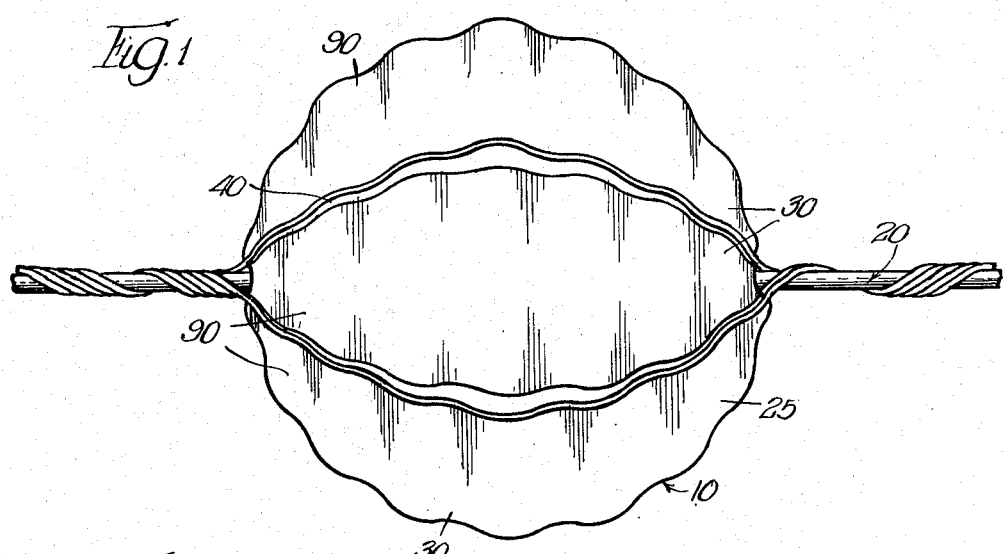
FIGURE 1 is a side view in elevation of the signaling device embodying the invention as secured to a suspended line.

Referring now to FIG. 1, there is shown a signaling device embodying the invention, generally denoted by the numeral 10. The signaling device 10 is attached to a linear body, such as a suspended electrical conductor, generally denoted by the numeral 20. As shown in FIG. 1, the signaling device 10 in this particular instance is substantially spherical in shape and consists of a plurality of spherical segments 30. While the terms "spherical segments" have been used it should be understood that such is merely by way of convenience. Specifically, each of the segments could be characterized as a surface forming unit which may or may not combine with other units to form a composite three dimensional configuration. The surface forming units are not limited to a spherical shape although a spherical shape may be one of the most desirable configurations. The spherical segments 30 might further be defined as polar spherical segments and are arranged in a closely spaced relationship along their spherical edges and cooperate to form a sphere. However, it is to be noted that in the preferred embodiment there is a slight space 40 intermediate adjacent spherical segments 30. In the construction shown in FIGURE 1 the sphere 25 is composed of six of the spherical segments 30, although only three are shown.

Figure 2:
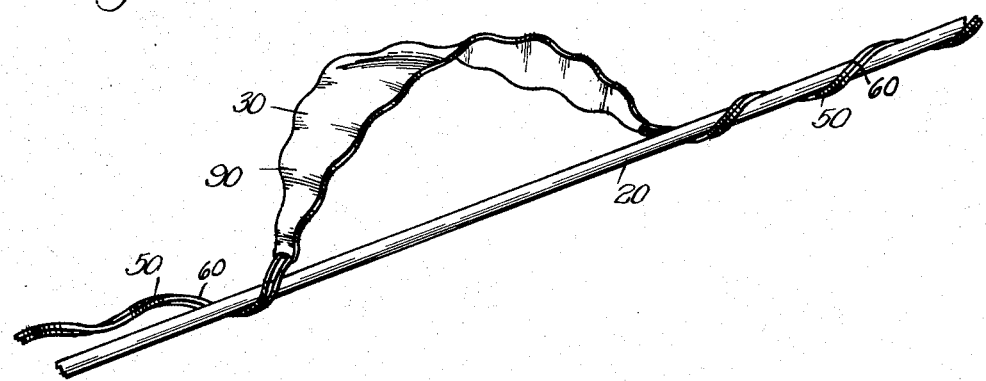
FIGURE 2 is a perspective view of one of the elements utilized in the construction of the signaling device embodying the invention as shown in FIGURE 1.

Referring now to FIG. 2 there is shown a perspective view of one of the spherical segments 30. Each of the segments 30 includes at least one wire element 50 extending from its end and having the helically-preformed portions 60. The helically-preformed portions 60 are formed to a helix having an internal diameter and a sufficiently open pitch that they may be applied to the line 20 from the side without substantially exceeding their elastic limit, as disclosed in the patents to Peterson, Nos. 2,587,521, 2,609,653, 2,729,054 and 2,761,273. In the preferred embodiment shown in FIG. 2, each of the segments 30 is provided with a pair of the wire elements 50 extending from each of its ends and having helically-preformed portions 60, which are arranged in a mutually conforming bridging relationship. It will be apparent, however, that in some instances it may be possible to eliminate the necessity for having more than one wire element extending from the end or that it may be possible to eliminate the elements from one end altogether, so as to have elements extending from one end only.

Figure 3:
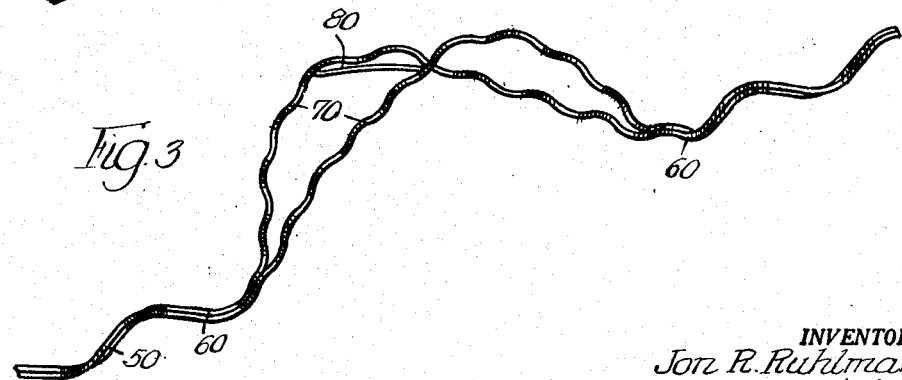
FIGURE 3 is a perspective view of the wires utilized in the construction of this element shown in FIGURE 2.

As shown in FIG. 3, the elements 50 extend throughout the length of the spherical segment 30 and include the two helical portions 60. The intermediate portions 70 have been diverted from their normal helical course and arranged so as to cooperate between themselves to form a spherical segment. In this particular construction the entire length of the elements 50 have been helically-preformed in the manner previously described. After such preformation the intermediate portions 70 are then diverted in the manner shown in FIG. 3 to form the spherical segments. The helical construction of the portions 70 lend an increased rigidity to them so as to resist deformation as the result of the forces to which the appliance is subjected when applied to the linear body 20. In this manner it is possible to utilize a rather light weight, or gauge, wire in the construction of the appliance and at the same time achieve the desired strength.

In order to maintain the intermediate portions 70 in their desired relationship, a member 80 extends therebetween and is secured thereto by any suitable means such as tieing, welding, brazing and the like, as shown in FIG. 3. The member 80 in one preferred form is a wire, possibly of the same stock from which the elements 50 are constructed.

After the elements 50 have been constructed in the manner shown in FIG. 3, the intermediate portions in the space therebetween are then covered with some lightweight material 90 that will provide the visual characteristics, primarily color, necessary for it to function as a warning device. Materials that have been found particularly suited for this usage are plastics, fiberglass, aluminum and the like, that are commercially available in the form of sheets and that may be readily applied to the intermediate portions 70. The sheets are first placed over the intermediate portions 70 so as to fill the gap therebetween and then are secured to the wires in some suitable manner. The sheet material should be of some color, which provides contrast with the background surroundings of sky, water, or ground, so as to be readily visible to the eye.

It is to be noted that the construction shown in FIGURE 3 is merely by way of example. As a matter of fact any number of wire elements 50 within reason may be utilized in the construction of each of the spherical segments. Normally the number will be dictated by the strength desired. Thus, the greater portion of the sphere represented by each of the segments, the greater the number of wires required. It will be understood that in some instances members such as strings, rods of plastic and the like may be substituted for the wires.

It is also apparent that the sphere 25 may be constructed of any number of spherical segments and is obviously not limited to a construction including six of the segments as indicated in FIGURE 1. For example, the sphere 25 may be constructed of two spherical segments, which then would be hemispheres, or conversely, may be constructed of any number greater than the six indicated in FIGURE 1.

As mentioned previously the segments may be arranged to define three dimensional figures other than a sphere. Furthermore, it is not necessary that the segments actually define a complete three dimensional figure. The segments need merely be arranged so that they will provide a sufficient visual warning to signal the presence of the conductor to which they are attached. It is to be noted that in keeping with the fact that figures other than spheres are within the scope of the invention, the segments 30 are not necessarily spherical segments, but may take the form of any finite surface, either planar or curved.

When the sphere 25 is suspended from a line, there will be little, if any, tendency to accumulate water as the result of either precipitation or condensation as the result of the spaces 40. As soon as any water enters into the space defined by the spherical segments 30 it is immediately drained out through the lowermost spaces as the result of gravity. The spaces also permit any air or wind to flow through the sphere 25, as well as around it. In this manner, as mentioned previously, the force to which the line is subjected as the result of such wind is substantially minimized.

As stated previously, the helically-preformed portions eliminate the undesired feature of inducing a stress concentration. The helically-preformed elements and particularly, the portions 60 are flexible, so that when the line is vibrated the helically-preformed portions will vibrate along with the line. Obviously, along the length of attachment the portions 60 will tend to resist such vibration, due to the increased mass of material and their own natural resiliency and will thus tend to dampen the vibration of the line. It has been found, however, that as a result of the flexibility of the helically-preformed portions of attachment, that the tendency to create an area of stress concentration is substantially eliminated so as to minimize the possibility of fatigue failure.

When the spherical segments 30 are arranged in the spherical relationship, it can be seen that the portions 60 cooperate to form a tubular sheath, which may be fully, or is at least partially, closed. The tubular sheath, when fully closed, is radically self-supporting as mentioned in the Peterson patents. The portions 60 are applied from the side as indicated in FIGURE 2 by wrapping them around the line of association. In this particular instance the portion shown at the left hand end of the spherical segment 30 must be wrapped in a clockwise direction, until the entire length of the portion 60 surrounds the line 20. If the internal diameter of the helically-performed portions 60 is made slightly less, in fact approximately fifteen percent less, than the external diameter of the line, it has been found that the natural gripping force of the elements will prevent any axial movement of the sphere. As a matter of fact, it is pointed out in the Peterson patent, the gripping strength of a full complement of helically-preformed elements having an internal diameter eighty-five percent of the external diameter of the line to which they are applied, may be greater than the strength of the line. It should be noted that the elements are adapted to be applied when the line is energized, so that it is not necessary during the installation of the subject invention to interrupt the source of power supply carried by it.

It is to be further noted that the pitch length may be varied throughout the helically formed portions. For example, it is desirable in some instances to form the elements to a relatively long pitch or even be straight adjacent the spheroidal portion of the segment with the pitch length gradually decreasing toward the end. The purpose of such is to aid in symmetrically arranging the elements around the line of application.

Referring now to FIGURES 4 and 5 there is shown a modification of the invention generally denoted by the numeral 100. The modification is similar to the first embodiment shown in FIGURES 1 through 3, in that it comprises the segments 102 which when mounted on a line 20 form a sphere 104. In the modification the segments 102 are formed the rods 106, which include the helically formed portions 108. The intermediate portions 109 of the rods 106 are uniformed with regard to the helix, except that they are of arcuate shape so that two adjacent rods define a spherical surface. In the preferred embodiment the rods 106 are constructed from some light weight material, such as a plastic, having sufficient strength and rigidity to permit them to perform as required. The rods 106 in each segment 102 are maintained in their spaced relationship by means of the intermediate strap 110 which is secured thereto by any suitable means. In one preferred form the straps are of a plastic material and are attached by bending the ends so as to embrace the rods 106 and then heat setting the straps so that it becomes substantially rigid and the bent ends become permanent fixed.

As can be seen in FIGURE 4 each of the segments 102 is provided with a covering of suitable material that will provide the visual characteristics, primarily color, necessary for it to function as a warning device. As mentioned previously, various materials may be used, such as plastic, fiberglass, aluminum and the like.

When the segments 102 have been installed on the line 20 they are then interconnected by means of the strap 112 in order to maintain them in their regularly spaced relationship and to provide additional strength to the warning sphere. The straps 112 may be secured to the segments 102 by any suitable means. In one preferred form the straps are provided with the apertures 114 which correspond with like apertures in the segments 102 and which are adapted to receive rivets, screws or the like.

The remaining constructional characteristics of the modification shown in FIGURES 4 and 5 are substantially the same as the embodiment shown in FIGURES 1 and 3. Therefore, repetition of such characteristics need not be repeated.

It can now be seen that the subject invention fulfills all the features and objects set forth hereinbefore. While certain specific terminology and constructions have been utilized and disclosed in the specification, it is to be understood that these are merely by way of example, and in no manner to be considered as limitations. It will be apparent that certain modifications may be made within the scope of the claims without departing from the spirit of the invention.

It is claimed:

1. An appliance adapted to be mounted on a linear body such as a suspended electrical cable comprising a plurality of surface forming units, each of said surface forming units being composed of a plurality of elements having first and second end portions, said first and second end portions being helically formed to an internal diameter and a sufficiently open pitch so as to be applicable to said linear body from the side thereof without exceeding the elastic limits of the elements, said elements being diverted from their normal helical courses intermediate their ends so that a pair of adjacent ones of said elements define a finite area therebetween, material means substantially coextensive with said finite area secured to and extending between said adjacent elements, said surface forming units being closely spaced along their edges and arranged to define a three dimensional figure.

2. An appliance adapted to be mounted on a linear body such as a suspended electrical cable comprising a plurality of surface forming units, each of said surface forming units being composed of a plurality of elements having first and second end portions, said first and second end portions being helically formed to an internal diameter and a sufficiently open pitch so as to be applicable to said linear body from the side thereof without exceeding the elastic limits of said elements, said elements being diverted from their normal helical courses intermediate their ends so that a pair of adjacent ones of said elements define a finite area therebetween, a material means substantially coextensive with said finite area secured to and extending between said adjacent elements, said surface forming units being closely spaced along their edges and arranged to define a three dimensional figure, said material means being adapted to be brightly colored so that said surface forming units when attached to the linear body signal the presence of the same.

3. A surface forming unit adapted to be attached to a linear body such as a suspended electrical cable comprising at least a pair of substantially coextensive elements having first and second end portions and an intermediate portion, said first and second end portions being helically formed so as to be applicable to a linear body from the side thereof to attach said surface forming unit to the linear body, said elements being spaced throughout said intermediate portions so as to define a finite area therebetween, and a sheet of material means secured to and extending between said adjacent elements.

4. The combination comprising a suspended cable, and at least one surface forming unit, said unit comprising at least a pair of wire-like elements, each of said elements having first and second end portions and an intermediate portion, said end portions of said pair of wire-like elements being wound around said cable so as to attach said surface forming unit thereto, said intermediate portions of said pair of wire-like elements being substantially coextensive and being spaced so as to define a finite area therebetween, and material means to said wire-like elements and substantially coextensive with said wire-like elements.

5. The combination comprising a suspended cable and a plurality of spherical surface forming units, each of said units comprising at least a pair of wire-like elements, each of said wire-like elements having first and second end portions and an intermediate portion, said end portions of said wire-like elements being wound around said cable so as to attach said surface forming unit thereto, said intermediate portions of said pair of wire-like elements being substantially coextensive and spaced so as to define a finite area, material means substantially coextensive with said finite area secured to and extending between said adjacent elements, said plurality of spherical surface forming units being closely spaced along their edges and arranged to form a sphere.

6. The combination comprising a suspended cable and a plurality of spherical surface forming units, each of said units comprising at least a pair of wire-like elements, each of said wire-like elements having first and second end portions and an intermediate portion, said end portions of said wire-like elements being wound around said cable so as to attach said surface forming unit thereto, said intermediate portions of said pair of wire-like elements being substantially coextensive and spaced so as to define a finite area, a sheet of material substantially coextensive with said finite area secured to and extending between said adjacent elements, said plurality of spherical surface forming units being closely spaced along their edges and arranged to form a sphere, and means extending between said surface forming units for maintaining the same in predetermined positions.

7. An appliance adapted to be mounted on a linear body such as a suspended electric cable comprising a plurality of surface forming units, each of said units being composed of a plurality of elements having first and second end portions, said first and second end portions being helically formed so as to be applicable to a linear body from the side and adapted to attach the appliance thereto, said elements being spaced intermediate said first and second end portions so as to define a finite area therebetween, material means substantially coexistent with said finite area secured to and extending between said adjacent elements, said surface forming units being arranged so as to define a spherical body.

References Cited by the Examiner
UNITED STATES PATENTS

| | | | |
|---|---|---|---|
| 287,337 | 10/83 | Stubbe | 256—6 |
| 287,372 | 10/83 | Ford | 256—6 |
| 297,487 | 4/84 | Bacon | 256—4 |
| 312,463 | 2/85 | Hart | 256—6 |
| 1,627,423 | 5/27 | Bierce | 116—173 |
| 1,765,823 | 6/30 | Burke | 116—114 |
| 2,117,240 | 5/38 | Cohon | 41—10 |
| 2,587,521 | 2/52 | Peterson | 248—63 |
| 2,926,452 | 3/60 | Lewis | 114—22 |

FOREIGN PATENTS 1,064,419  12/53  France.

LOUIS J. CAPOZI, *Primary Examiner.*

C. W. ROBINSON, *Examiner.*

UNITED STATES PATENT OFFICE
CERTIFICATE OF CORRECTION

Patent No. 3,183,883                                    May 18, 1965

Jon R. Ruhlman et al.

It is hereby certified that error appears in the above numbered patent requiring correction and that the said Letters Patent should read as corrected below.

Column 2, line 62, for "defined" read -- defining --; column 5, line 30, for "uniformed" read -- unformed --.

Signed and sealed this 16th day of November 1965.

(SEAL)
Attest:

ERNEST W. SWIDER                                   EDWARD J. BRENNER
Attesting Officer                                        Commissioner of Patents